United States Patent
Schneider et al.

(10) Patent No.: US 6,356,738 B1
(45) Date of Patent: Mar. 12, 2002

(54) METHOD AND APPARATUS FOR COMMUNICATING DATA WITH A TRANSPONDER

(76) Inventors: Gary W. Schneider, 126 Dorset Ct., Castle Rock, CO (US) 80104; Drew J. Thwaites, 6365 Warriors Run, Littleton, CO (US) 80125

( * ) Notice: Subject to any disclaimer, the term of this patent is extended or adjusted under 35 U.S.C. 154(b) by 0 days.

(21) Appl. No.: 09/252,951

(22) Filed: Feb. 18, 1999

(51) Int. Cl.[7] .................. H04B 5/00; G08B 13/14; G08B 26/00

(52) U.S. Cl. .................. 455/41; 340/572.1; 340/505

(58) Field of Search .................. 455/41, 575, 351, 455/129, 269; 379/551; 340/572.4, 572.6, 572.7, 572.1, 581, 568.1, 568.7, 505, 10.1, 10.4, 825.72; 713/300, 322, 501, 323, 600; 375/312; 332/112; 235/375

(56) References Cited

U.S. PATENT DOCUMENTS

| | | | |
|---|---|---|---|
| 5,340,968 A | * 8/1994 | Watanabe et al. | 235/380 |
| 5,701,121 A | * 12/1997 | Murdoch | 340/825.54 |
| 5,949,823 A | * 9/1999 | Suga et al. | 375/256 |
| 6,081,901 A | * 6/2000 | Dewa et al. | 713/300 |
| 6,104,333 A | * 8/2000 | Wood, Jr. | 341/173 |

* cited by examiner

*Primary Examiner*—Dwayne Bost
*Assistant Examiner*—Ray Persino
(74) *Attorney, Agent, or Firm*—Pitney, Hardin, Kipp & Szuch LLP

(57) ABSTRACT

A method and system for communicating data between controller and a transponder where the processor is powered by current received from an antenna. The controller is magnetically coupled to the transponder to sense impedance variations in the transponder. The impedance of the transponder is altered by varying current used by a processor within the transponder. The processor current is controlled by varying the processor clock rate.

15 Claims, 5 Drawing Sheets

METHOD AND APPARATUS FOR COMMUNICATING DATA WITH A TRANSPONDER

BACKGROUND OF THE INVENTION

1. Field of the Invention

The present invention relates, in general, to data communications, and, more particularly, to communicating data between a transponder and an inductively coupled base station.

2. Relevant Background

Smart cards are wallet-sized devices that allow their holder to access and manipulate selected data based on the information held in the smart card. In contrast with conventional transaction cards with data stored on a magnetic stripe applied to the transaction card, a smart card includes active data processing components to support multiple applications, more functions, more features, and higher transaction speeds. Typical applications include automatic fare collection, ticketless travel, health care, access control, manufacturing automation, point-of-sale transactions, and on-line payments or fund transfers. Smart cards also enable a single card to support multiple applications. The smart card industry is expected to grow rapidly as the need for electronic commerce increases.

Two basic classes of smart cards exists: those that operate through physical contact with a terminal and those that operate through radio frequency (RF) data transmission between the smart card and the terminal. The latter class are referred to as "contactless" smart cards. Contactless implementations are preferred because they ease use, simplify hardware, and in theory last longer with less maintenance because of the lack of wear and tear caused by physical contact.

One contactless technology uses a host computer that writes data to and reads data from the card through a controller. The card is alternatively referred to as a transponder. The controller communicates with the host computer via a serial or parallel connection. The controller translates signals and data received from the host computer into signals that are to be communicated to the transponder.

When commanded to communicate with a transponder the controller continuously produces an unmodulated carrier from its antenna coil. The transponder contains a coil of wire that derives energy from the controller signal to power the electronics on board the transponder. Power supply circuitry coupled to the transponder's coil rectifies and filters the received energy to provide stable voltage potentials for the transponder. However, in general the transponder power supply is quite fragile in that the total quantity of energy transferred from the controller is quite limited as compared to many electronic applications.

Signal and data information can be communicated by modulating the carrier using, for example, frequency shift keying (FSK). While the card remains in a sufficiently intense controller field it transmits signal and data information back to the controller using, for example, phase shift keying (PSK) In this manner the controller and transponder remain in continuous communication while the transponder remains in the controller field. It is important that the communication link remain continuous to avoid unnecessary latency in the communication and to avoid corrupt data transfers due to interrupted communication resulting from transponder shutting down or resetting due to lack of power.

In one contactless technology the controller and transponder are magnetically coupled. This technology is sometimes referred to as inductive signaling. The transponder does not emit an RF signal, but instead modulates the impedance of its antenna coil. The changing impedance can be detected at the controller's antenna coil as a change in mutual inductance. In other words, as the transponder modulates the impedance of its coil, the impedance of the controller's own coil changes in a detectable manner.

Prior transponder circuits modulate the coil impedance using an impedance that is switched in and out across the coil. This impedance consumes current when it is switched in. Hence, while the transponder is sending data, the current drain caused by the impedance modulation circuit can be substantial. As a result, the transponder power supply can be pulled down or loaded by the impedance modulation circuit to a point where one or more electronic components no longer have sufficient voltage to operate. A need exists for a method and system for communicating information from a transponder that does not interfere with the transponder's power supply.

SUMMARY OF THE INVENTION

Briefly stated, the present invention involves a method and system for communicating data between controller and a transponder where the processor is powered by current received from an antenna. The controller is magnetically coupled to the transponder to sense impedance variations in the transponder. The impedance of the transponder is altered by varying current used by a processor within the transponder. The processor current is controlled by varying the processor clock rate.

DETAILED DESCRIPTION OF THE PREFERRED EMBODIMENTS

The present invention is described in terms of a contactless smartcard system in which a transponder communicates using a defined protocol with a transponder. The particular examples herein are based on a transponder that has an on-board processor and on-board programmable memory. The transponder includes an on-board power supply that obtains power from the transponder's antenna while the transponder is in a sufficiently strong RF field created by the controller. In the preferred implementations the controller transmits a first data signal at a first carrier frequency to the transponder. The transponder receives the first data signal and generates a second data signal in response at a second carrier frequency. By way of example, the first data signal is encoded using frequency shift keying (FSK) modulation and the second data signal is encoded using phase shift keying (PSK) modulation. It should be understood that unless otherwise specifically indicated these specific implementation details are provided to ease description and understanding and are not to be construed as limitations on the present invention.

Figure 1:
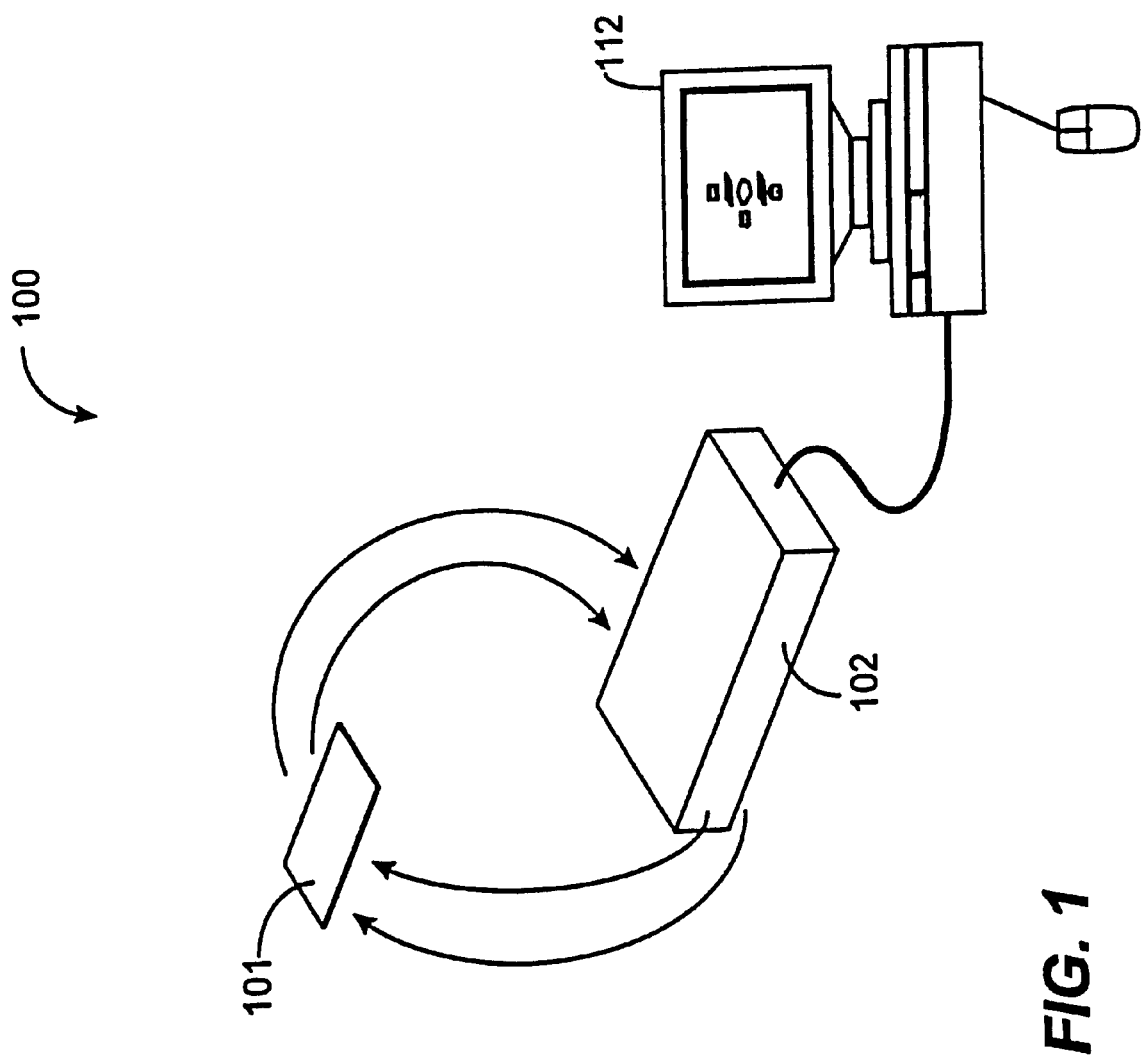
FIG. 1 illustrates components of a smart card environment in accordance with the present invention.

FIG. 1 illustrates essential elements of a smartcard system in accordance with the present invention. Controller 102 is coupled to receive data and control information from a host computer 112. Host computer 112 may be coupled to controller 102 by a physical connection such as a wire, cable, or fiber optic link, or may be logically connected by a network such as a local area network, wide area network, or the Internet.

Controller 102 generates an RF field, referred to herein as a "controller field", that powers transponder 101 in the specific examples herein. The controller field comprises, for example, a time-varying electromagnetic field that varies at a specified carrier frequency. Data, control and/or signal information (collectively referred to as "data") are encoded into the controller field in a conventional manner. To provide ample power to transponder 101, controller 102 may continuously transmit data whereas transponder 101 may transmit only periodically to conserve energy.

The present invention is embedded, for example, in the hardware and/or computer program devices embodied in memory on board transponder 101. In the specific example of FIG. 1, transponder 101 communicates with controller 102 using a PSK signal in one direction and a FSK signal in the other direction. In response to data received from controller 102, transponder 101 extracts and processes the data using an on-board data processor (e.g., a microprocessor or microcontroller integrated circuit). Processing instructions may be stored permanently or semi-permanently in memory on-board the transponder, or may be received in the data from controller 102. Transponder 101 generates a response data signal that is encoded for transmission to controller 102. As used herein, the term "transmit" includes impedance signaling transmission in which the response data signal is essentially encoded into the controller field in a manner that can be detected by controller 102.

In the particular examples the circuitry within transponder 101 draws energy from the controller field or "loads" the controller field. While transponder 101 is in the controller field, controller 102 and transponder 101 are inductively coupled. The controller detects the degree of loading by mutual inductance. In other words, the effective impedance of the controller's antenna increases as the transponder loads the controller fields and decreases as the transponder reduces the load on the controller field. In this manner, transponder 101 can communicate to controller 102 by varying the effective impedance of the circuit elements on board transponder 101 (e.g., the effective impedance of the transponder's input antenna).

Figure 2:
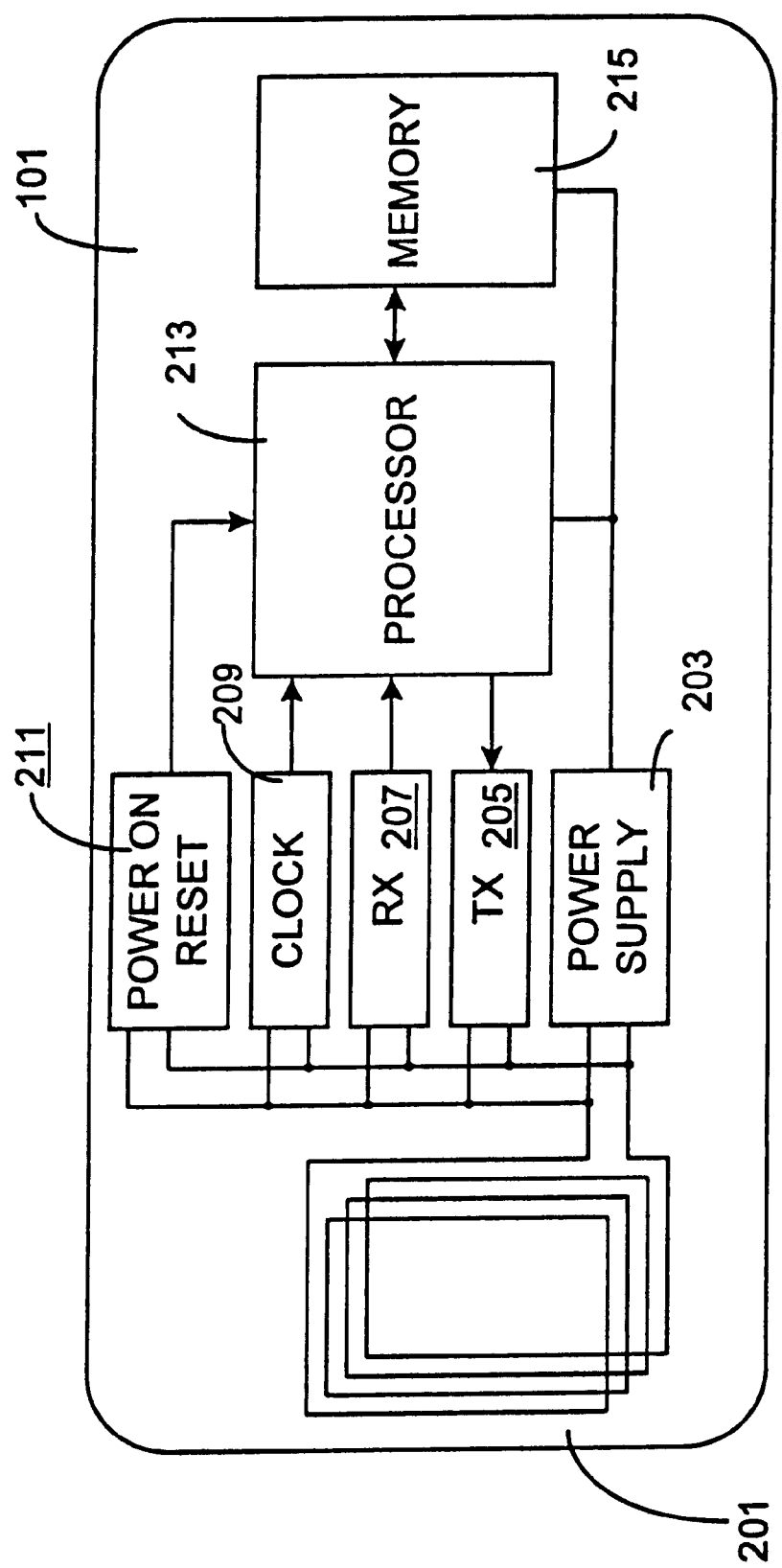
FIG. 2 shows in block diagram form components of a transponder in accordance with the present invention.

FIG. 2 illustrates in block diagram form major components of a transponder 101 in accordance with the present invention. Transponder 101 has an antenna 201 that receives electromagnetic energy from a surrounding field. This electromagnetic energy may include encoded data and clock signals generated by a controller 102 as shown in FIG. 1. Antenna 201 can be implemented, for example, as a coil comprising one or more turns of conductive wire sized and shaped to receive sufficient energy from the controller field at a specified distance from a controller 102.

Antenna 201 has a characteristic impedance determined by physical characteristics of the antenna (e.g., conductivity, parasitic capacitance and inductance). The effective impedance of antenna 201 refers to the impedance as seen by controller 102. The effective impedance is a function not only of the physical characteristics of antenna 201, but also the load impedance of the other components of transponder 101. The effective impedance as measured at controller 102 will also vary with the distance between transponder 101 and controller 102, but this variance is treated as a predictable change in signal to noise ratio and does not otherwise affect the operation of the present invention.

Various functional units within transponder 102 are coupled to antenna 201 as shown in FIG. 2. Significantly, each of these functional units draws energy from the energy received by antenna 201. Hence, each of the functional units load antenna 201 with an impedance. As more current is drawn, the effective impedance of antenna 201 decreases. Conversely, as less current is drawn, the effective impedance of antenna 201 increases. In prior implementations this effect was handled primarily as a background noise issue and efforts were made to stabilize the energy drawn by the circuitry on transponder 101. In contrast, the present invention uses this phenomena as a signaling mechanism and power regulation mechanism.

Power supply unit 203 is coupled in parallel with antenna 201 and includes available rectification, regulation, and filtering circuitry that provides a sufficiently stable direct current voltage supply output. The voltage supply output is used to power processor 213 and memory 215 as well as any other components of transponder 101 that require a regulated DC supply. Power supply unit 203 may also generate an unregulated supply voltage used by functional units that do not require power regulation.

Transmit unit 205 (labeled TX in FIG. 2) receives a response data signal from processor 213 and encodes the response data signal into a format suitable for coupling to antenna 201. Usually the response data signal comprises a serial binary data stream. In the particular example, TX unit 205 uses phase shift keying. Receive (RX) unit 207 decodes the signal on antenna 201 to extract data from the controller field. RX unit 207 generates a receive data signal that is coupled to an appropriate input of processor 213.

Clock unit 209 is coupled to antenna 201 and generates one or more clock signals used by other circuitry on transponder 101. For example, clock unit 209 senses the carrier frequency of the controller field and generates a plurality of internal clock signals by dividing down the sensed carrier frequency. Any available circuitry may be used to implement clock unit 209. In a particular implementation the carrier frequency of the FSK encoded signal from controller 102 is a 13.57 MHz signal that is reduced by frequency division to a 6.8 MHz internal signal used to clock processor 213. Clock unit 209 also generates a clock signal at the desired carrier frequency for the return PSK data signal. In the particular implementation the PSK signal carrier frequency is 847 kHz. The specific frequencies are provided to aid in complete understanding of the invention, but can be altered significantly to meet the needs of a particular application.

Power on reset unit 211 is coupled to antenna 201 and processor 213 to detect when transponder 101 has entered a controller field and to aid in the boot up of processor 213. Power on reset unit 211 also operates to reset processor 213 into a known state when the power supply voltage drops for any reason to a level that forces a reset of processor 213. Power on reset unit 211 can be implemented with any available circuit technology.

Memory unit 215 comprises non-volatile read-write memory in the preferred implementation. To reduce power consumption in the powered down state it is desirable to use a memory technology such as ferroelectric random access memory (FRAM) or an equivalent low power, long retention memory technology. Memory unit 215 is configured with an address and control bus that is compatible with processor 213.

Although the functional components of transponder 101 are illustrated as separate functional units in FIG. 2 it should be understood that any or all of the functional units may be integrated into a single integrated circuit chip depending on the implementation technology and cost restraints of a particular application. Such integration is considered equivalent to the particular implementations described herein.

Figure 3:
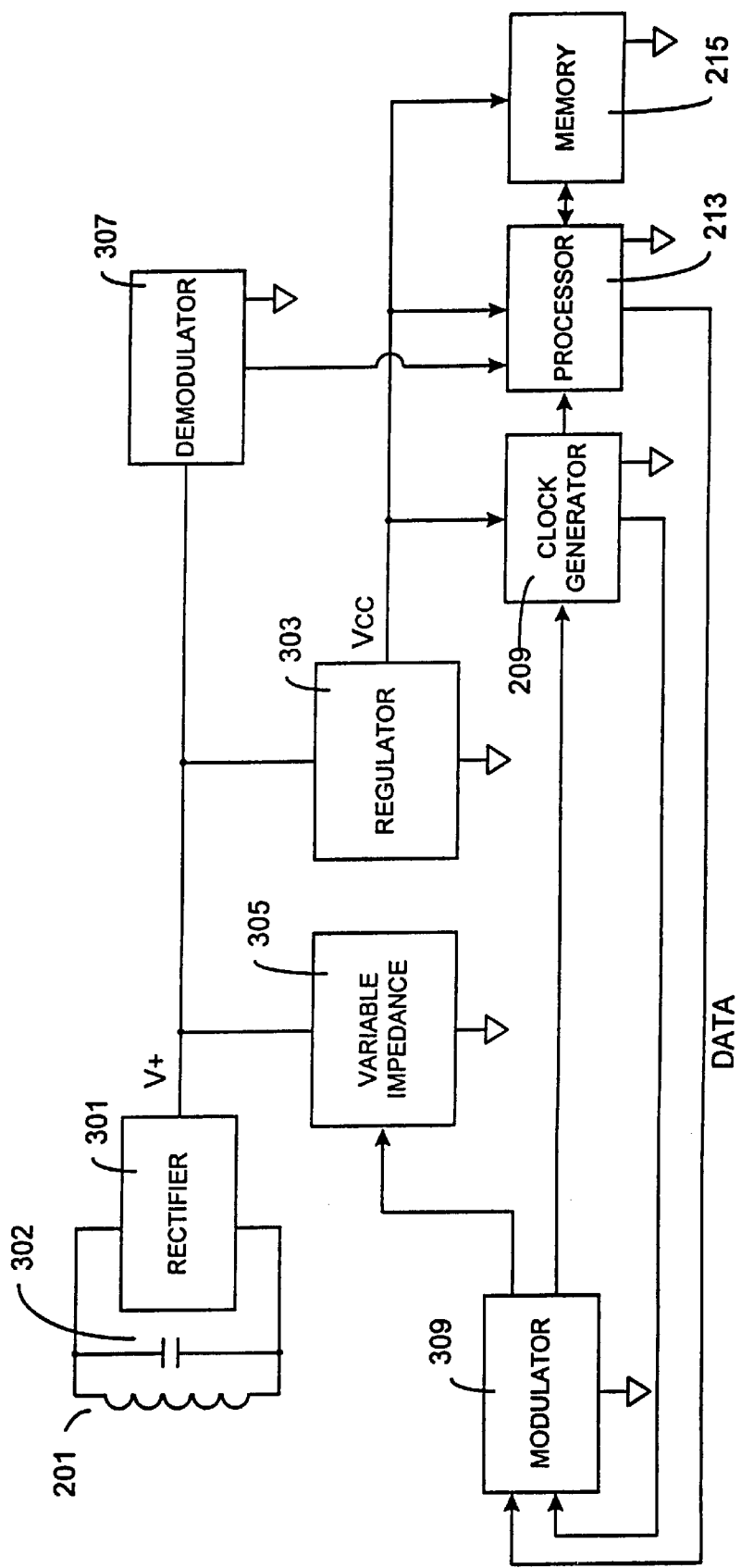
FIG. 3 shows components shown in FIG. 2 in greater detail.

FIG. 3 shows an alternative block diagram view of a transponder in accordance with a particular implementation of the present invention. Power supply unit 203 is implemented in FIG. 3 using a rectifier circuit 301 coupled across antenna 201 and tuning capacitor 302. Rectifier circuit 301 is conveniently implemented using a diode bridge or equivalent circuit elements. Rectifier 301 outputs an unregulated DC power supply labeled V+ in FIG. 2. The unregulated power supply voltage is coupled to a regulator circuit 303 to produce a regulated DC voltage labeled VCC. Regulator 303 may be implemented, for example, using a Zener diode regulator circuit or an equivalent.

The unregulated voltage from rectifier 301 also includes a data signal that is received from the controller field. Rectification will not destroy an FSK modulated signal. If other modulation techniques are used, it may be necessary to couple demodulator 307 directly to antenna 201. Demodulator 307 is coupled to receive V+ and extract the data signal using available demodulating circuitry. The demodulated received data is applied to an appropriate input of processor 213.

Processor 213 processes the received data signal to generate a response data signal that is coupled to modulator 309. The response data signal comprises, for example, a serial binary data stream. Modulator 309 is also coupled to clock generator 209 to receive a clock signal having a frequency set at the carrier frequency for the PSK response signal. Modulator 309 modulates the carrier signal with the response data signal to generate a modulated response signal (e.g., a PSK modulated signal).

The modulated response signal is coupled back to enable the clock generator unit 209. In the particular implementation only the processor clock signal is enable/disabled so that any other clock signals generated by clock generator unit 209 continue to be generated irrespective of the modulated response signal. In this manner, the clock signal coupled to processor 213 is varied to increase and decrease the processing rate of processor 213 in response to the response data signal. In operation, when transponder 101 is transmitting, the processor clock (e.g., a 6.8 MHz clock) is turned off and on at the carrier frequency of the response signal (e.g., 847 kHz) thereby varying the current consumed by processor 213 at the carrier frequency.

In the particular example, the period of the response carrier signal is eight times longer than the period of the processor clock. In other words, each cycle of the response carrier signal spans eight cycles of the processor clock. When the processor clock is switched by the response carrier signal at a 50% duty cycle, for example, it receives the four 6.8 MHz pulses, then "misses" four cycles. This in effect cuts the processor operating frequency in half and cuts the current used by processor 213 roughly in half. This in turn modulates the effective impedance of antenna 201 in a manner that can be readily detected by a controller 102 (shown in FIG. 1).

It is contemplated that the processor clock may be varied using something other than a 50% duty cycle enable signal. For example, in some applications a 75% duty cycle may provide adequate impedance modulation, while other applications may require a 25% duty cycle. Also, the processor clock variation may be achieved by providing two processor clocks (e.g., a 6.8 MHz clock and a 3.4 MHz clock) and using the modulated response signal to controllably switch which of the clocks is provided to processor 213. This alternative approach suffers from more complex circuitry and clock synchronization problems that the preferred implementation avoids.

Optionally and preferably, the modulated response signal is also coupled to a variable impedance circuit 305. Variable impedance circuit 305 is coupled to the V+ line so as to affect the effective impedance of antenna 201 in response to the modulated response signal. In this manner, variable impedance circuit 305 works cooperatively with the effective impedance modulation provided by switching clock generator 209 on and off to boost the signal strength of the impedance modulated signal supplied to antenna 201.

Figure 4:
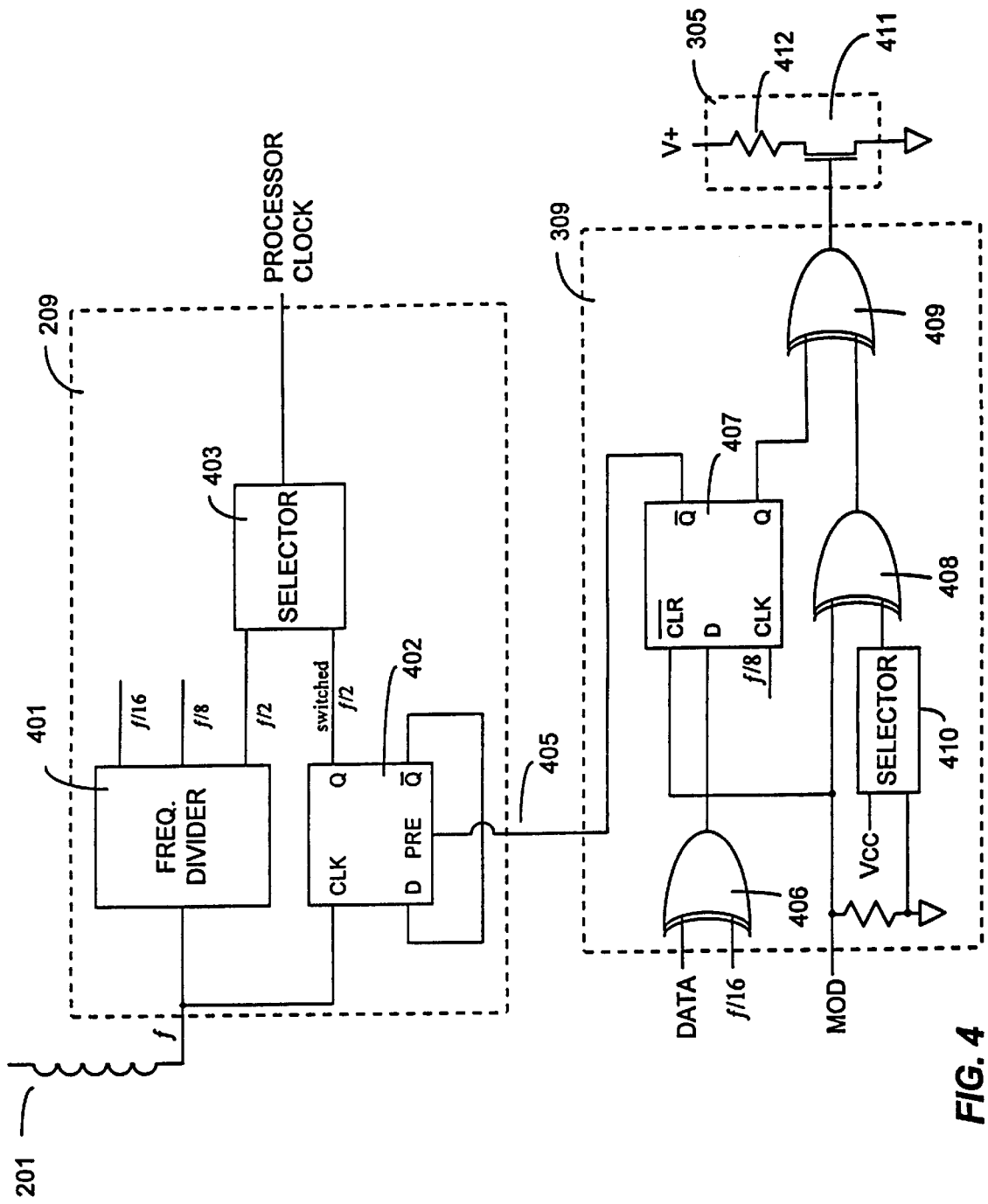
FIG. 4 illustrates in block diagram form selected components in FIG. 3 in greater detail.

FIG. 4 shows a simplified circuit diagram of a specific implementation of clock generator 209, modulator 309, and variable impedance 305. Clock generator 209 is implemented as a multiple tap frequency divider circuit 401 receiving as input the time varying signal on antenna 201 produced by the controller field. Frequency divider 401 can include any number of taps, but in the specific implementation includes taps selected to provide a divide-by-two, a divide-by-eight and a divide-by-sixteen output. In the specific example of a 13.57 MHz signal on antenna 201, this provides 6.8 MHz, 1.7 MHz, and 847 KHz signals.

Flip-flop 402 implements a divide by two frequency divider that can be selectively enable by controlling the signal on its preset input. Selector 403 is used to select between the constant $f/2$ signal provided by divider circuit 401 or the switched $f/2$ signal provided by flip-flop 402. Essentially, the present invention is disabled by selecting the constant $f/2$ signal. In a specific implementation selector 403 is implemented as a jumper that is manually set. It is noted that selector 403 is entirely optional and if the user does not wish to disable the present invention it need not be supplied. Flip-flop 402 is merely an example of a specific implementation of a switched clock generator circuit and can be readily implemented with a wide variety of functionally equivalent circuit implementations. For example, the $f/2$ output of frequency divider 401 may simply be switched on and off with a switching devices such as a transistor.

The processor clock is switched by the modulated response signal supplied by modulator 309 on line 405. Exclusive-or (XOR) gate 406 has a first input coupled to receive the response data signal (labeled DATA in FIG. 4) on one input and the $f/16$ (i.e., 847 kHz) signal from clock generator 209 on a second input. XOR gate 406 produces an output comprising the PSK modulated response signal. Modulator 309 is enabled/disabled by a processor Signal (labeled MOD in FIG. 4). The modulator is expected to be enabled only when the transponder 101 is sending a response to the controller 102. Otherwise, the modulator is disabled.

When modulator 309 is enabled, it produces a PSK signal to control the variable impedance circuit 305 and it produces signal 405 to control the switched $f/2$ signal for processor clock switching. The PSK signal is the true output (labeled Q in FIG. 4) of flip-flop 407. The input into this flip-flop is generated by Exclusive-OR (XOR) gate 406. This XOR gate has a first input coupled to receive the processor response data signal (labeled DATA in FIG. 4) on one input and the $f/16$ (i.e., 847 kHz) signal from clock generator 209 on a second input. XOR gate 406 produces an output comprising the PSK modulated response signal. This signal is clocked into flip-flop 407 at a rate of $f/8$ (i.e., 1.7 MHz).

When the modulator is disabled, flip-flop 407 is held in reset by the MOD signal at the inverted input (labeled CLR-bar in FIG. 4). The produced signal at the inverted output of flip-flop 407 (labeled Q-bar in FIG. 4) forces the clock switching circuit to produce a non-switching processor clock at a frequency of $f/2$. Additionally, the produced signal at the true output of flip-flop 407 (labeled Q in FIG. 4) prevents the PSK switching of the variable impedance circuit 305.

When the modulator is disabled, variable impedance circuit 305 is in one of two default states. If selector 410 selects Vcc, FET 411 is active and resistor 412 is switched on and the effective impedance of antenna 201 is reduced. If selector 410 selects ground, FET 411 is inactive and resistor 412 is switched off, and the effective impedance of antenna 201 is unchanged. Selector 410 therefore sets the effective impedance of antenna 201 when not sending a response to controller 102. In a specific implementation, selector 410 is implemented as a jumper that is manually set.

The inverted output of flip-flop 407 (labeled Q-bar in FIG. 4) is coupled to drive the enable input of clock generator 209. The true output (labeled Q in FIG. 4) is coupled to drive the optional variable impedance 305. When configured to enable the present invention, the $f/2$ processor clock is switched using the modulated response signal as described hereinbefore. When variable impedance circuit 305 is used, the modulated response signal is used to turn FET 411 on and off so as to switch resistor 412. Resistor 412 is coupled to V+ so that when FET 411 is active the series impedance of resistor 412 and FET 411 is seen across antenna 201.

Figure 5A:
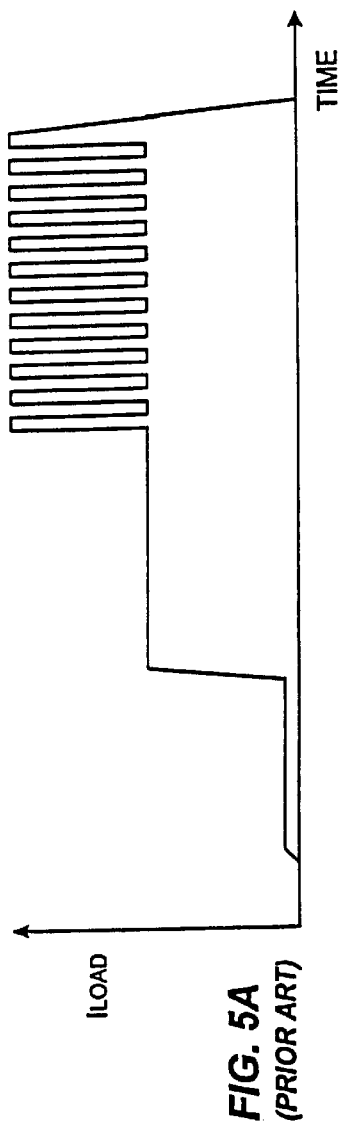
FIG. 5A–FIG. 5B show waveforms illustrating operation in accordance with the present invention.
Figure 5B:
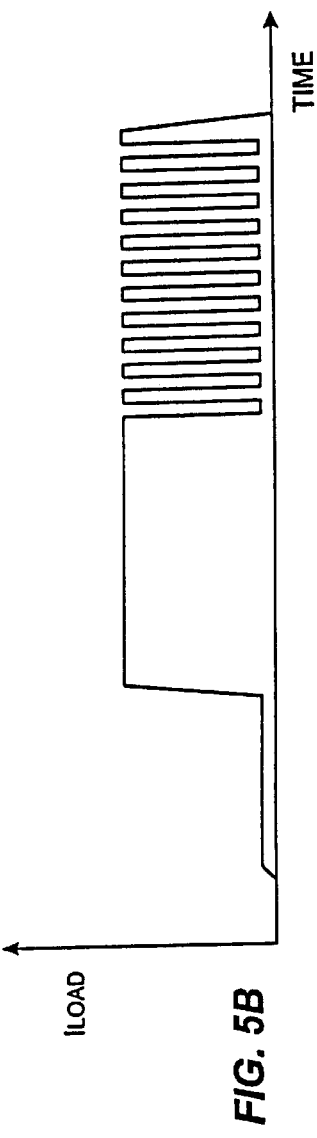
Figure 5C:
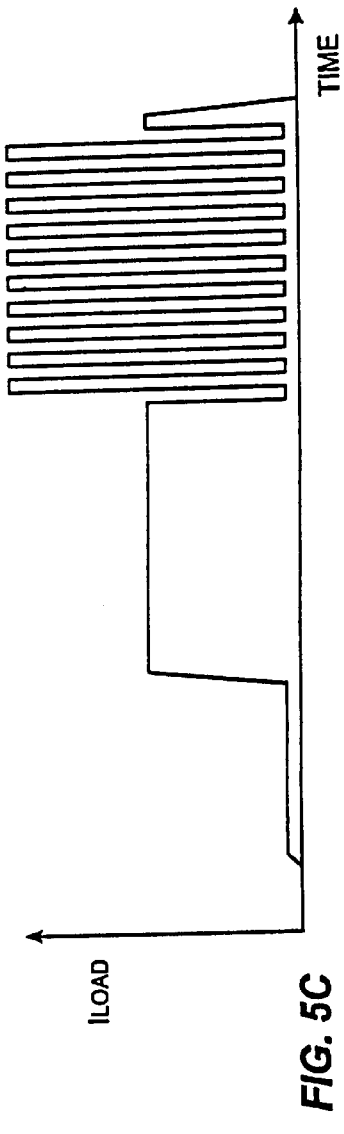

The waveforms shown in FIG. 5A–5C are simplified current or power usage diagrams useful in understanding the operation of the present invention. In operation, FET 411 is active while the switched $f/2$ processor clock is switched on so that current load is maximized. Controller 102 senses this condition as the effective impedance of antenna 201 is minimized. FET is turned off while the switched $f/2$ processor clock is switched off so that current load is minimized. Controller 102 senses this condition as the effective impedance of antenna 201 is maximized.

FIG. 5A shows a prior art current usage waveform for reference. During a power up phase, various components of transponder 101 draw a minimal amount of current to become operational, while power on reset unit 211 shown in FIG. 2 disables processor 213 until VCC reaches a stabile minimum voltage. Once VCC is stabilized processor 213 is activated. During the receive phase, processor 213 is clocked at its normal operating frequency (e.g., 6.8 MHz in the specific examples) and processes data received from the controller field in a conventional manner. During a transmit phase, the prior art device switched in an impedance across the receive antenna to increase the current load on the antenna. The impedance is switched nominally at the carrier frequency and results in current peaks during the transmit phase Significantly, the prior art system results in a total power usage during the transmit phase that is significantly greater than that used during the receive phase. At times this power usage can be so large as to cause the VCC line to droop thereby resetting processor 213.

In contrast, FIG. 5B illustrates a first embodiment of the present invention in which the switched processor clock is used alone (i.e., without variable impedance circuit 305) to modulate impedance. The power up and receive phases operate in a conventional manner. However, the transmit phase operates to decrease current load while the processor clock is turned off. This decrease in current load translates to an identical signal that can be sensed by controller 102. However, the total power usage during the transmit phase is actually less than the power used during the receive phase and so the risk of processor reset due to VCC droop is substantially reduced.

FIG. 5C illustrates the preferred alternative embodiment in which both the switched processor clock and the variable impedance 305 are enabled. In this embodiment the average power during transmit is substantially equal to the average power consumed during the receive phase and so the risk of VCC droop is substantially reduced as compared to the prior art. However, the signal magnitude that will be transmitted to controller 102 is significantly greater than in either the prior art or the embodiment shown in FIG. 5B. Larger signal magnitude results in more reliable data communications, lower error rate, and oftentimes a higher effective data rate.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for communicating data between controller and a transponder comprising the steps of:

providing a transponder including a processor powered by current received from an antenna; and modulating the impedance of the antenna by altering the current used by a processor within the transponder by altering the clock speed of the processor.

2. The method of claim 1 wherein the step of modulating further comprises turning the processor clock on and off at a preselected carrier frequency.

3. The method of claim 1 further comprising:

further modulating the impedance of the antenna by switching an impedance coupled in parallel with the processor.

4. The method of claim 1 further comprising:

deriving a direct current power supply from the antenna; and coupling current from the direct current supply to the processor.

5. The method of claim 1 further comprising a step of:

detecting the antenna's impedance modulation using the base station to receive data from the transponder.

6. A method for communicating data between controller having a controller antenna and a transponder having a processor and a transponder antenna, the method comprising the steps of:

sending a radio frequency (RF) signal from the controller antenna to the transponder antenna;

deriving a power supply voltage from the signal as received by the transponder antenna;

coupling the power supply voltage to the processor, wherein an effective impedance of the transponder antenna is partially determined by a current consumed by the processor;

while the transponder is in a receive mode, operating the processor at a steady state operating frequency; and while the transponder is in a transmit mode, varying the processor operating frequency to vary the effective transponder antenna impedance to create a transponder carrier signal on the transponder antenna.

7. The method of claim 6 further comprising:

generating a data signal in the processor; and modulating the carrier signal with the data signal.

8. The method of claim 6 wherein the step of varying the processor operating frequency comprises lowering the processor operating frequency to increase the effective antenna impedance.

9. The method of claim 6 further comprising:

while the transponder is in the transmit mode, further varying the effective transponder impedance by coupling an impedance in parallel with the transponder antenna to decrease the effective impedance and decoupling the impedance to increase the effective impedance.

10. A transponder for communicating data to a magnetically coupled controller, the transponder comprising:

an antenna for receiving energy while in an RF field generated by the controller;

a power supply circuit coupled to the antenna and generating a power supply voltage from the received energy;

a clock generator circuit coupled to the antenna and generating a clock signal from the received energy;

a processor coupled to receive power from the power supply circuit and coupled to the clock generator circuit to receive the clock signal, wherein the processor operating speed is determined from the received clock signal; and a transmit circuit coupled to the clock generator for generating an impedance modulated signal on the antenna by selectively altering frequency of the clock signal.

11. The transponder of claim 10 further comprising:

a receiver circuit coupled to the antenna for extracting a first data signal from the received energy and supplying the first data signal to the processor.

12. The transponder of claim 10 further comprising:

an impedance modulation circuit coupled to the antenna and the transmit circuit.

13. The transponder of claim 10 further comprising:

computer program code devices operating in the processor to cause the processor to generate a second data signal; and a modulator within the transmit circuit and coupled to receive the second data signal, the modulator operable to encode the second data signal on the impedance modulated signal.

14. The transponder of claim 13 wherein the modulator comprises an exclusive OR gate having a first data input coupled to the second data signal, a second data input coupled to the clock signal.

15. A smartcard system comprising:

a controller unit generating a controller field, the controller field having data and signal information encoded therein;

a smartcard unit having an antenna for receiving the controller field and a processor for processing data and signal information extracted from the controller field and to produce a response data signal;

a transmit unit within the smartcard coupled to receive the response data signal and modulate the antenna impedance by controllably varying current used by the processor by altering the clock speed of the processor to encode the response data signal in the controller field.

* * * * *